(12) United States Patent
Lee et al.

(10) Patent No.: US 7,518,506 B2
(45) Date of Patent: Apr. 14, 2009

(54) SECURITY SYSTEM REPORTING EVENTS THROUGH E-MAIL MESSAGES

(75) Inventors: Albert Lee, Brooklyn, NY (US); Tony T. Li, Roslyn Heights, NY (US); Jaime E. Barahona, Hempstead, NY (US); James Ramroop, Bellport, NY (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 11/252,667

(22) Filed: Oct. 18, 2005

(65) Prior Publication Data

US 2007/0085676 A1 Apr. 19, 2007

(51) Int. Cl.
G08B 1/08 (2006.01)
G08B 29/00 (2006.01)

(52) U.S. Cl. .................. 340/539.18; 340/539.19; 340/539.16; 340/539.17; 340/531; 340/541

(58) Field of Classification Search ............ 340/539.18, 340/539.19
See application file for complete search history.

(56) References Cited

U.S. PATENT DOCUMENTS

| | | | | |
|---|---|---|---|---|
| 5,917,405 A | * | 6/1999 | Joao | 340/426.17 |
| 6,023,223 A | * | 2/2000 | Baxter, Jr. | 340/531 |
| 6,535,123 B2 | * | 3/2003 | Sandelman et al. | 340/506 |
| 6,617,969 B2 | * | 9/2003 | Tu et al. | 340/517 |
| 6,661,340 B1 | * | 12/2003 | Saylor et al. | 340/517 |
| 6,703,930 B2 | * | 3/2004 | Skinner | 340/539.11 |
| 6,727,813 B2 | * | 4/2004 | Iwasaki et al. | 340/531 |
| 6,741,171 B2 | * | 5/2004 | Palka et al. | 340/501 |
| 6,782,294 B2 | * | 8/2004 | Reich et al. | 700/19 |
| 6,853,299 B2 | * | 2/2005 | Shiratori et al. | 340/506 |
| 6,975,220 B1 | * | 12/2005 | Foodman et al. | 340/531 |
| 6,977,585 B2 | * | 12/2005 | Falk et al. | 340/506 |
| 7,015,806 B2 | * | 3/2006 | Naidoo et al. | 340/531 |
| 7,042,350 B2 | | 5/2006 | Patrick et al. | |

* cited by examiner

Primary Examiner—Donnie L Crosland
(74) Attorney, Agent, or Firm—Husch Blackwell Sanders Welsh & Katz

(57) ABSTRACT

Security system communication with a user device via electronic means, including via e-mail transmitted over the internet are provided. A security system interface receives a signal indicating an occurrence of an event, such as a fault or alarm condition, in a zone of the security system; a memory stores a user e-mail address associated with the security system and the address of a server for providing internet service, such as an ISP server; and an e-mail generator transmits to the server an e-mail message based on the event. The communication node in such a system may be integrated with the control panel of the security system. The e-mail generator can transmit the e-mail using SMTP or other TCP/IP. An attachment of the e-mail, such as a picture or an audio or video file relevant to the event or the zone may be transmitted.

16 Claims, 3 Drawing Sheets

SECURITY SYSTEM REPORTING EVENTS THROUGH E-MAIL MESSAGES

FIELD OF THE INVENTION

This invention relates generally to the field of security systems, and in particular to fault and alarm condition reporting to a user's portable or wired device via electronic signaling, including e-mail.

BACKGROUND OF THE INVENTION

Conventionally, a control panel of the security system upon receiving an alarm or security condition signal from a zone of the security system transmits an appropriate signal, such as an alarm code signal, to a central station. In the central station conventionally, a human operator monitors the receipt of such signals and reports the receipt of such signals to a pre-specified user receiving station, such as the telephone number associated with the user, and/or to the police or security personnel.

Security systems offer a degree of security for residential sites and for office, business, or industrial applications. Typically, a security device monitoring or controlling a zone is provided as part of a security system. For example, an alarm may be set, which is triggered upon the occurrence of various threat or alarm conditions. At a larger installation such as in a residential, business, industrial or office setting, more than one zone and security device may be provided at various locations of the site. The security devices are typically connected to a security control panel, which is essentially a control board or control module for security for the site. Also, a remote central monitoring station may be connected, and this central monitor station may be notified when an alarm condition, a threat condition, or some other type of security breach, a fire condition, or other type of emergency condition or the like is detected. A fault may comprise the tripping of an alarm, the triggering of an alarm condition, including an opening or breaking of a window, door, gate, lock or the like, a detected motion, an interaction by a user at a keypad or user interface, including for example, as attempted entry or providing of an incorrect PIN or code, a broken wire, or any other such condition. For example, whether or not the security system is armed, faults can be detected. By way of illustration, a user at a keypad may interact with the system causing a fault, or a motion sensor can detect motion and register a fault, even if the security system is not armed.

However, using such a central station in a conventional configuration requires personnel monitoring of the security system, typically on a 24-hour, seven-day basis. Also, notifying the central station typically entails a delay between the receipt by the central station of the alarm signal, event notification or condition status from the control panel and the telephone call to the user associate with the site monitored by the security system, because the human operator at a central station must notice the signal, and appropriately intervene, by identifying the correct phone number and placing the call to the user.

In addition, typically a user may not always be found at a particular pre-specified telephone number at any given hour of the day. The user may be traveling and available only at a cell phone or portable communication device at any particular time, or may be accessible via a user terminal at an office or at home but not via a previously designated telephone number registered to the user. Also, the user may be monitoring an e-mail receiving terminal, but not a conventional telephone.

In addition, users expect notification in a familiar format, and in a format in which the priority level or importance and essential content of the notification can be recognized virtually instantly. A user may not always wish to be interrupted via voice notification, or may wish to know in advance essential information about the event, fault or alarm condition before deciding whether the user wishes to be interrupted. Further, it may be desirable to provide a photograph, audio or video information about the event or alarm condition along with the notification of essential data about the event or alarm condition to be reviewed immediately or at the user's convenience.

BRIEF SUMMARY OF THE INVENTION

A method, system and apparatus for security system communication with a user device are provided. The system includes a security system interface configured to receive a signal indicating an occurrence of an event in a zone of the security system; a memory configured to store a user e-mail address associated with the security system; and an e-mail generator configured to transmit to a server for providing internet service an e-mail for the e-mail address based on the event. The event may be a fault in one or more zones of the security system.

A communication node in such a system can include a control panel of the security system. Further, the server for providing internet service may be an ISP server, such that the ISP is selected by a user associated with the security system and the address of the server is stored by said memory. The e-mail generator may be configured to transmit the e-mail using SMTP or other TCP/IP.

Together with the e-mail, as an attachment of the e-mail, or as separate message a picture may be transmitted. For example, the picture may be taken from the zone of the security system. Also, the e-mail may include an audio file or a video file. Such audio file and video file may be associated with the zone of the security system or captured by cameras or microphones therein.

DETAILED DESCRIPTION OF THE INVENTION

Figure 1:
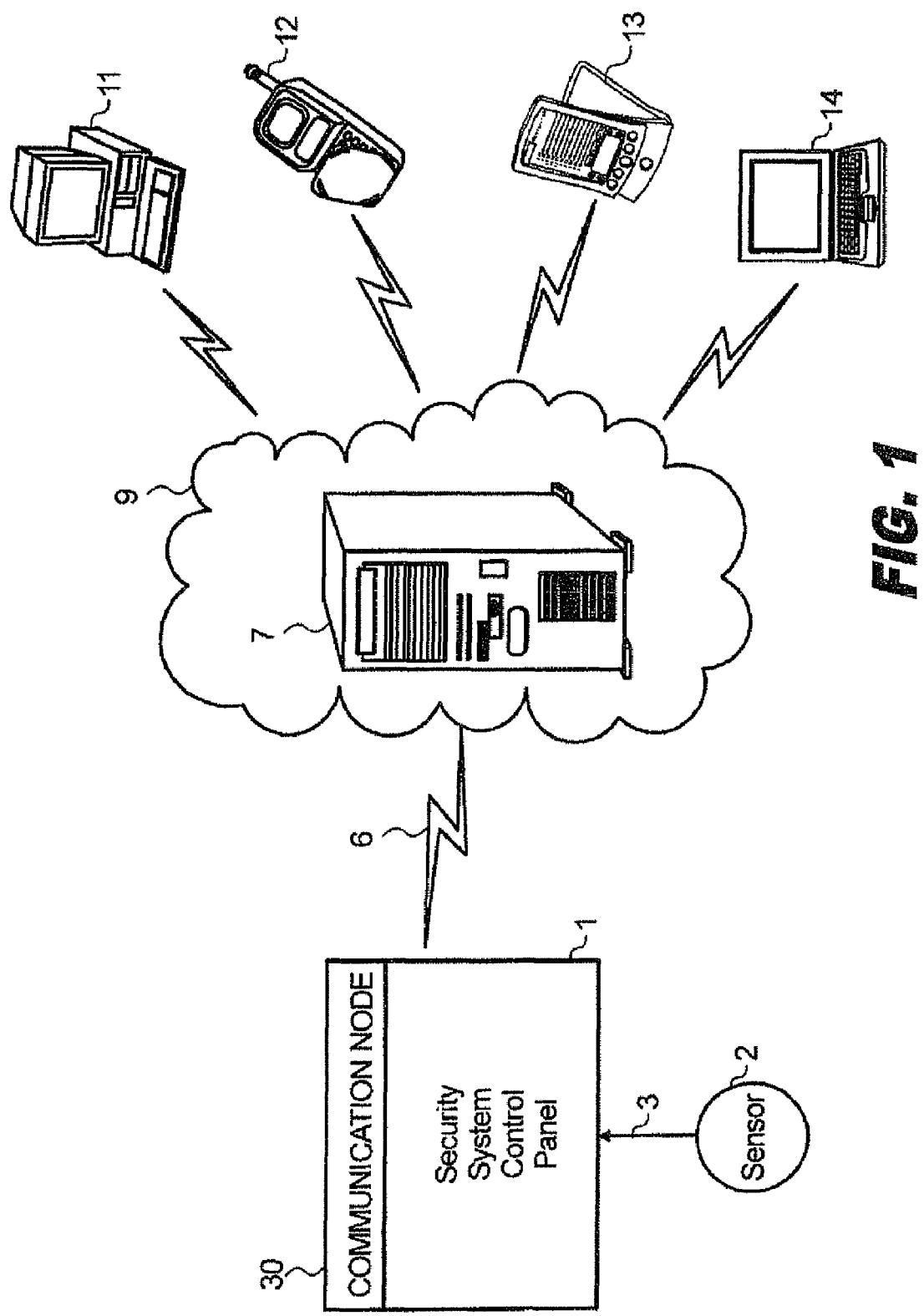
FIG. 1 illustrates schematically a security system communicating with a user's device via a network, according to an aspect of the present invention.

The following discussion describes embodiments of Applicant's invention as best understood presently by the inventors, however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments or parts thereof, without departing from the spirit of the invention. The figures and the detailed description are therefore to be considered as an illustrative explanation of aspects of the invention, but should not be construed to limit the scope of the invention. The scope of the invention is defined by the below-set forth claims.

Aspects of the invention will be described with reference to FIG. 3, which is a schematic diagram of a communication node 30 for a security system. The communication node 30 includes a security system interface 31, which is configured to communicate with the security system, including for example receiving alarm signals, alert signals or other types of security condition signals from the security system; a controller 32 for processing the incoming signals and controlling and coordinating modules of the communication node 30; a memory 33 for storing data, such as a record of a fault or alarm condition, an e-mail addresses associated with users, and an address of a server associated with users and of servers associated with accessing the Internet such as ISP servers; and an e-mail generator/browser 34 for generating an e-mail addressed to the addresses associated with the user via the server to notify of the alarm condition received; a user interface 35, which allows a user or security system maintenance person or technician to enter commands and otherwise interact with the communication node 30, including providing to the communication node 30 the e-mail address of a user and the address of the server associated with the user or with an ISP; a central station interface 36 for communicating with the central station when the communication node 30 is operating in a conventional manner or in default or emergency mode; and a control panel functions module 37 for performing other functions of the control panel when the communication node 30 comprises the control panel.

The communication node 30 may embody or perform the functions of the control panel, or may be connected via a wired or wireless connection to one or more devices performing the functions of the control panel. Alternative, the functions of the communication node 30 may be performed off-premises, such as by a server or node at a central station. The communication node 30, as shown in FIG. 3, may be comprised of a control panel for a house, site, or application, and thus may be connected by a wired or wireless connection to each of the keypads that control individual zones of the site and/or to each of the sensors or security devices, including motion detectors and sensors, door, window or gate sensors, fire, smoke carbon monoxide detectors or the like, keypads and user interfaces, and such forth in each zone. Alternatively, the communication node 30 may be connected to the control panel via wired or wireless connection and may be notified of an event or fault by control panel via the communication node's security system interface 31.

Figure 2:
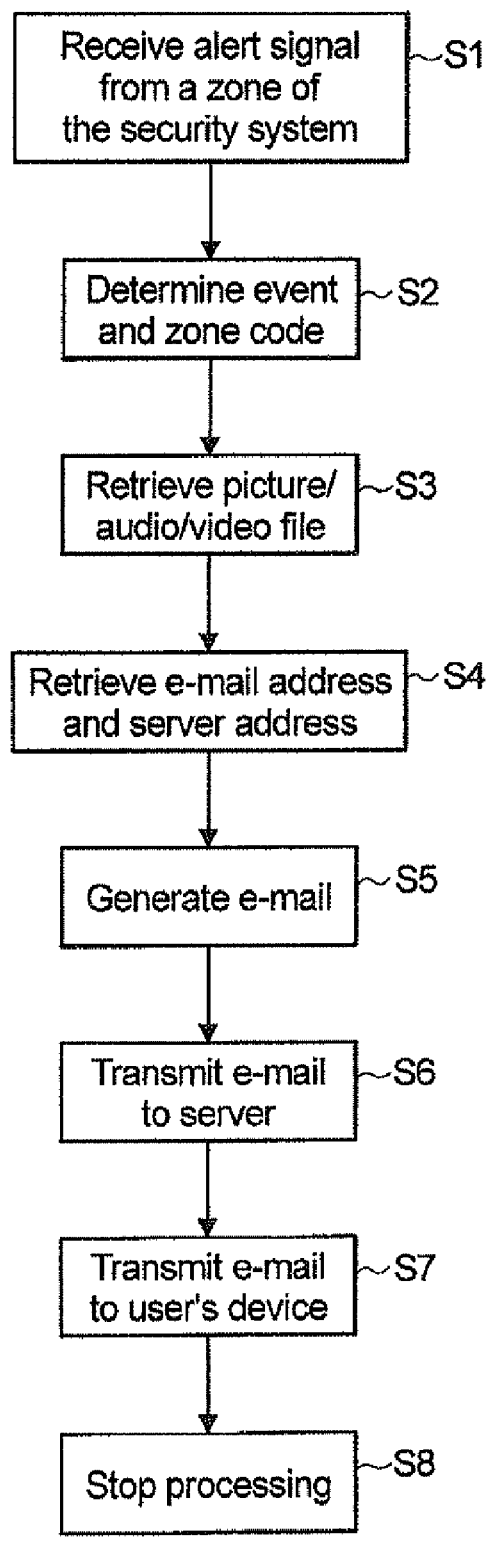
FIG. 2 illustrates a flowchart of an operation of a system according to an aspect of the present invention.
Figure 3:
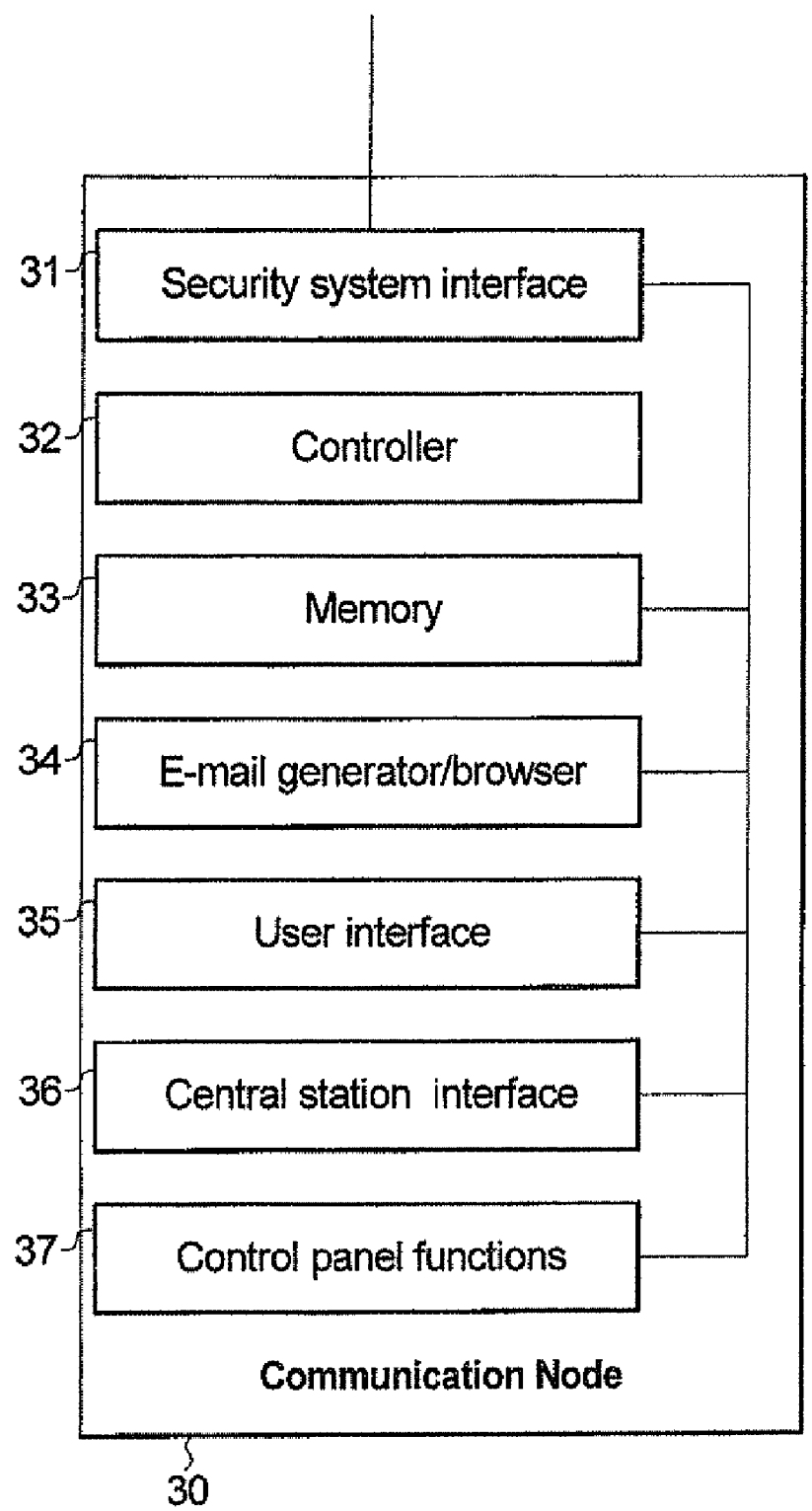
FIG. 3 illustrates a communication node of a security system according to an aspect of the present invention.

An operation of a system according to the present invention will now be provided with reference to FIGS. 1-3. Upon detection of a fault or an alarm condition, such as detection by motion sensor of motion, a breach or attempted breach in a wire, door, gate, alarm window, skylight or the like, an attempted entry or at a keypad or other interaction with a keypad or user interface, low battery, short circuit, smoke, fire or carbon monoxide condition, a defect condition or the like, by a sensor 2 shown in FIG. 1 of the zone of the security system, a signal is transmitted from the zone to the control panel 1, via a wire or wireless connection 3 of the security system. An event may comprise a fault or alarm condition, and/or may comprise other types of signals, such as security system messaging, security camera activation, arming/disarming of the security system, or the like. FIG. 1 shows the communication node 30 as a unit of the security system control panel 1. Accordingly, when the fault or event signal is received, control panel determines the type of fault of event based on the received signal, and determines the zone.

According to another aspect of the present invention, communication node 30 is physically distinct from the control panel, and the security system interface 31 of the communication node 30 receives from the control panel via a wired or wireless connection a signal indicating the zone and the type of fault or alarm condition determined by the control panel. In either case, as shown at S1 of FIG. 2, communication node 30 receives a signal indicating the fault or event. At S2, the type of event and the zone is identified based on the signal received. The signal from the zone indicating the fault may include a code indicating the type of fault, or the communication node 30 of the security system control panel 1 may determine the type or nature of the fault after receipt of the initial fault signal based on further information obtained from the zone and/or other zones and sources.

According to aspect of the present invention, a command is issued by controller 32 to a sensor device, such as a camera, video camera, microphone, or combination of the foregoing, in the zone to take a photograph or video or to capture audio data, so that more information may be obtained about the event that triggered the alarm condition, as shown at S3. For example, cameras, video cameras or microphones to capture audio information may be oriented to capture data from the event. Alternatively, the zone may be set to automatically capture such image data, video data or audio data upon the triggering of the fault or alarm condition. Such captured data may be saved and transmitted as MPEG, JPEG, MP3 or many other types of data, and may be compressed or encrypted before transmission.

At S4, an e-mail address associated with the user and a server address are retrieved from memory 33 by e-mail generator/browser 34. For example, the user may provide an e-mail address network or an e-mail address associated with a portable communication device or cell phone at which the user may be reached.

Also, the user may provide several e-mail addresses, and each of these addresses may be stored in memory 33. Accordingly, an e-mail message may be transmitted to one or more of the e-mail addresses provided. According to an aspect of the present invention, the event or alarm condition could also be notified to a central station in addition to generating the e-mail for the user, or may be provided to the police or security personnel in addition to the e-mail message generation.

An e-mail message is then generated at S5, using SMTP (simple mail transfer protocol) or other IP (Internet protocol), with the e-mail message addressed to the e-mail address or addresses retrieved. The e-mail, for example, could identify the fault or event, describe information pertaining to the fault or event, such as the type of situation, the date, the time, and a location of the event, fault or alarm condition. By way of illustration, the e-mail message may include information such as "fire alarm, Aug. 20, 2005, 7:45 AM, basement" to notify the user of the place or zone, date and time and nature of the event or fault.

As shown at S6, access to the Internet 9 is made using the ISP server 7 designated by the server address in the memory 33 using the wired or wireless connection 6. For example, if the user has access to the Internet at home via AOL, then an AOL server address would be provided in the memory and used to access the Internet. It will be understood, that such connection may be a DSL connection, a dial up connection, an ISDN connection, cable modem or set-top device based connection, or any other type of suitable wired or wireless Internet connection. The photograph, video or audio data may be included in the e-mail or attached as an attachment to the e-mail generated. The photograph, video or audio may also be sent as a separate data content file.

Alternatively, an off-board device (not shown) may be contacted by the communication node 30 via an ethernet LAN, WAN, or other type of internal security system connection or network, via the Internet or POTS, and this off-board device could have the functionality necessary for generating an SMTP/IP protocol e-mail message. This off-board device could also comprise a server, or group of servers, that provides access to the Internet 9. Accordingly, the e-mail to the user devices would be generated by the server based on the data provided by the communication node 30.

At S6, the server transmits the e-mail to the user's device or to several such devices. As shown in FIG. 1, such devices may comprise a personal computer 11, a cellular telephone 12, personal digital assistant (PDA)/handheld communication device 13 and/or a laptop computer or notebook computer 14. E-mail messages can be retrieved by protocols such as the Post Office Protocol (POP) or Internet message access protocol (IMAP). When the cellular telephone 12 or the PDA 13 is the target user device, a wireless network may have to be contacted via the Internet using an Internet/wireless network gateway server (not shown).

At S8, processing is stopped when the e-mail messages delivered to one or more of the target devices 11, 12, 13 and 14.

Accordingly, a more efficient, speedier and more cost-effective alert condition notification may be provided to a user, the system notification does not necessarily involve a central station or human operators. Further, notification may be provided in a more flexible manner to the device or devices currently used or monitored by the user, and in a manner convenient for the user to facilitate quick review and understanding by the user.

Preferred embodiments and methods of the present invention discussed in the foregoing are to be understood as descriptions for illustrative purposes only, and it will be appreciated that numerous changes, substitutions, omissions, and updates thereof are possible without departing from the spirit and scope of the claims.

What is claimed is:

1. A communication node of a security system, said communication node comprising:
   a security system interface configured to receive a signal indicating an occurrence of an event in a zone of the security system;
   a memory configured to store a user e-mail address associated with the security system; and
   an e-mail generator configured to generate an e-mail based on the event and transmit said e-mail using the user e-mail address to a server for providing internet service, wherein said e-mail is transmitted to said server using an internet protocol, and said e-mail includes information comprising at least one of an image file, an audio file, and a video file, said information transmitted as one of within the e-mail, and attached to the e-mail, said information stored as one of MPEG, JPEG, and MP3, and said information encrypted before transmission.

2. The communication node of claim 1, wherein the communication node comprises a control panel of the security system.

3. The communication node of claim 1, wherein the server for providing internet service is an ISP server, such that the ISP is selected by a user associated with the security system and the address of the server is stored by said memory.

4. The communication node of claim 1, wherein said internet protocol is at least one of SMTP and TCP/IP.

5. The communication node of claim 1, wherein said image includes a picture.

6. The communication node of claim 5, wherein the picture is taken from the zone of the security system.

7. The communication node of claim 5, wherein the picture is included in the e-mail as an attachment.

8. The communication node of claim 1, wherein the at least one of the image file, the audio file and the video file is associated with the zone of the security system.

9. A method of security system communication with a user device, said method comprising:
   receiving a signal indicating an occurrence of an event in a zone of the security system;
   storing a user e-mail address associated with the security system and an address of a server for providing internet service;
   generating an e-mail based on the event; and
   transmitting to the server said e-mail for the user e-mail address, wherein said e-mail is transmitted to said server using an internet protocol and said e-mail includes information comprising at least one of an image file, an audio file, and a video file, said information transmitted as one of within the e-mail, and attached to the e-mail, said information stored as one of MPEG, JPEG, and MP3, and said information encrypted before transmission.

10. The method of claim 9, wherein the event is a fault in at least a zone of the security system.

11. The method of claim 9, wherein said transmitting is performed by a control panel of the security system.

12. The method of claim 9, wherein the server for providing internet service is an ISP server, such that the ISP is selected by a user associated with the security system.

13. A control panel of a security system, said control panel comprising:
   security system interfacing means for receiving a signal indicating an occurrence of an event in a zone of the security system;
   memory means for storing a user e-mail address associated with the security system and an address of a server for providing internet service; and
   e-mail generating means for generating an e-mail based on the event and for transmitting to the server said e-mail for the user e-mail address, wherein said e-mail is transmitted to said server using an internet protocol and said e-mail includes information comprising at least one of an image file, an audio file, and a video file, said information transmitted as one of within the e-mail, and attached to the e-mail, said information stored as one of MPEG, JPEG, and MP3, and said information encrypted before transmission.

14. The control panel of claim 13, wherein the server for providing internet service is an ISP server, such that the ISP is selected by a user associated with the security system.

15. The control panel of claim 13, wherein said internet protocol is at least one of SMTP and TCP/IP.

16. The control panel of claim 13, wherein said image file includes a picture.

\* \* \* \* \*